(12) United States Patent
Hodelin et al.

(10) Patent No.: US 11,092,796 B2
(45) Date of Patent: Aug. 17, 2021

(54) LONG RANGE INFRARED IMAGER SYSTEMS AND METHODS

(71) Applicant: INTELLISENSE SYSTEMS, INC., Torrance, CA (US)

(72) Inventors: Juan F. Hodelin, Torrance, CA (US); Edward A. DeHoog, Long Beach, CA (US); Tin M. Aye, Corona, CA (US)

(73) Assignee: INTELLISENSE SYSTEMS, INC., Torrance, CA (US)

( * ) Notice: Subject to any disclaimer, the term of this patent is extended or adjusted under 35 U.S.C. 154(b) by 21 days.

(21) Appl. No.: 16/140,501

(22) Filed: Sep. 24, 2018

(65) Prior Publication Data

US 2019/0129162 A1 May 2, 2019

Related U.S. Application Data

(60) Provisional application No. 62/562,025, filed on Sep. 22, 2017.

(51) Int. Cl.
*G02B 23/00* (2006.01)
*G02B 23/12* (2006.01)
(Continued)

(52) U.S. Cl.
CPC .............. *G02B 23/12* (2013.01); *F41G 1/36* (2013.01); *F41G 1/38* (2013.01); *G02B 23/145* (2013.01); *G02B 23/2407* (2013.01); *H04N 5/33* (2013.01)

(58) Field of Classification Search
CPC .................................................. G02B 23/407
See application file for complete search history.

(56) References Cited

U.S. PATENT DOCUMENTS 9,323,061 B2 * 4/2016 Edwards ................ G02B 23/10
10,324,281 B2 * 6/2019 Wilzbach ........... G02B 21/0012
(Continued)

FOREIGN PATENT DOCUMENTS

DE     102014210053 A1    12/2015
WO      2014130128 A2     8/2014

OTHER PUBLICATIONS

International Search Report and Written Opinion in PCT/US2018/052499, dated Mar. 7, 2019.

*Primary Examiner* — David P Porta
*Assistant Examiner* — Djura Malevic
(74) *Attorney, Agent, or Firm* — Sheppard, Mullin, Richter & Hampton LLP

(57) ABSTRACT

Systems of the present disclosure may include one or more of an optical overlay device, which may include one or more of an imaging optic to receive incoming light from a scene, and project at least a portion of the incoming light onto an imaging sensor; an imaging sensor to transduce into image data the light projected onto it by the imaging optic; a processing engine electrically coupled with a non-transitory computer readable medium having machine readable instructions stored thereon, which, when executed by the processing engine, cause the system to: generate a scaled overlay image based on the image data and a magnification parameter; a display device configured to project the scaled overlay image through a display optic toward a portion of a beam-combiner; a coupling mechanism to enable releasable attachment of the optical overlay device with a primary viewing device.

27 Claims, 14 Drawing Sheets

(51) Int. Cl.
*F41G 1/38* (2006.01)
*F41G 1/36* (2006.01)
*G02B 23/24* (2006.01)
*H04N 5/33* (2006.01)

(56) References Cited

U.S. PATENT DOCUMENTS

| | | | | |
|---|---|---|---|---|
| 2007/0228259 | A1* | 10/2007 | Hohenberger | H04N 5/33 250/214 LA |
| 2008/0104875 | A1* | 5/2008 | Mayerle | F41G 1/40 42/118 |
| 2012/0030985 | A1* | 2/2012 | Mauricio | F41G 1/38 42/84 |
| 2012/0044386 | A1* | 2/2012 | Keitzer | H04N 5/23293 348/239 |
| 2012/0182417 | A1* | 7/2012 | Everett | F41G 1/30 348/135 |
| 2013/0279013 | A1* | 10/2013 | Edwards | G02B 27/0189 359/630 |
| 2014/0063055 | A1* | 3/2014 | Osterhout | G06F 3/165 345/633 |
| 2014/0226214 | A1* | 8/2014 | Edwards | G02B 27/017 359/630 |
| 2016/0290765 | A1* | 10/2016 | Maryfield | G02B 27/648 |
| 2017/0082847 | A1* | 3/2017 | Wilzbach | A61B 34/20 |

* cited by examiner

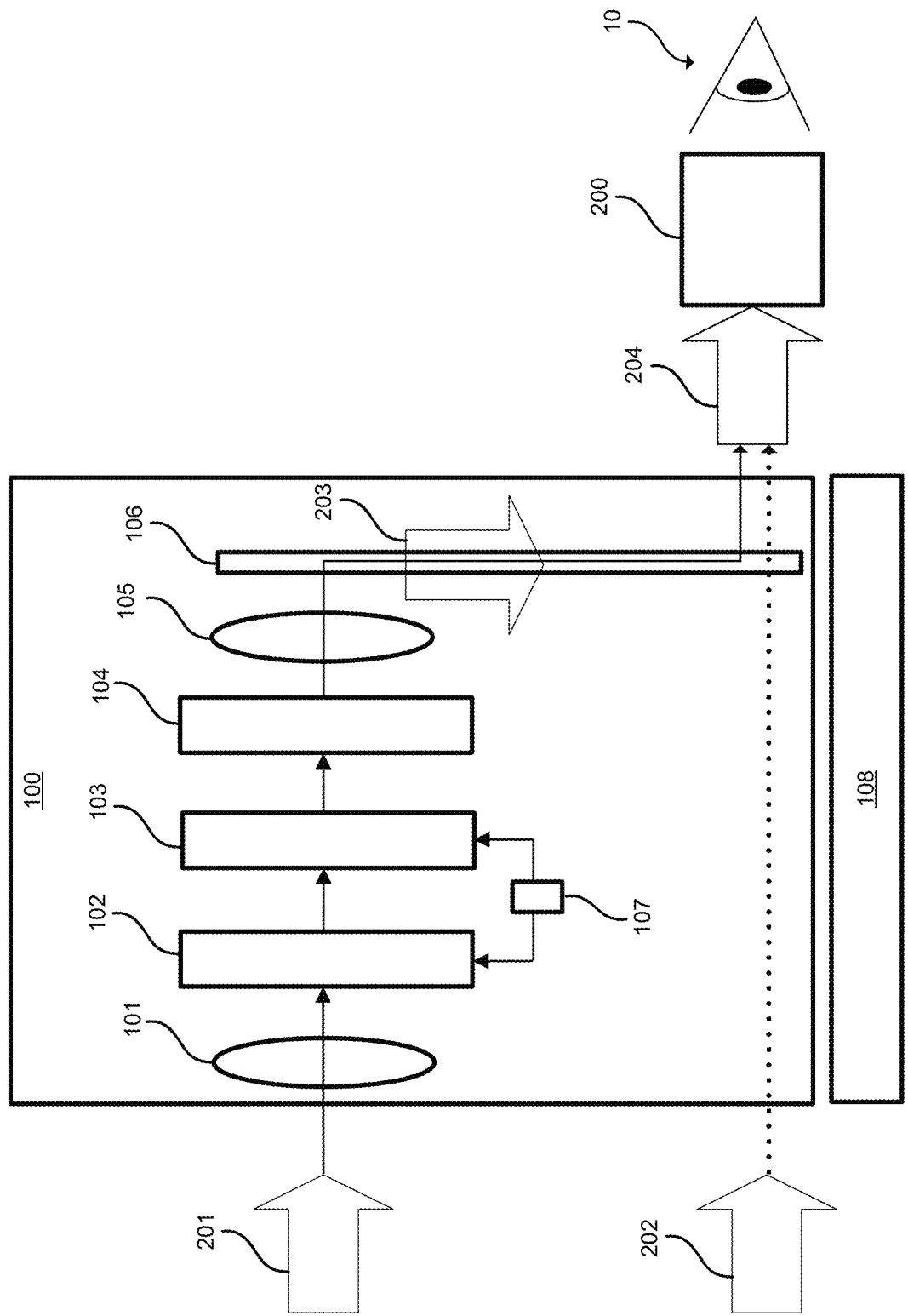

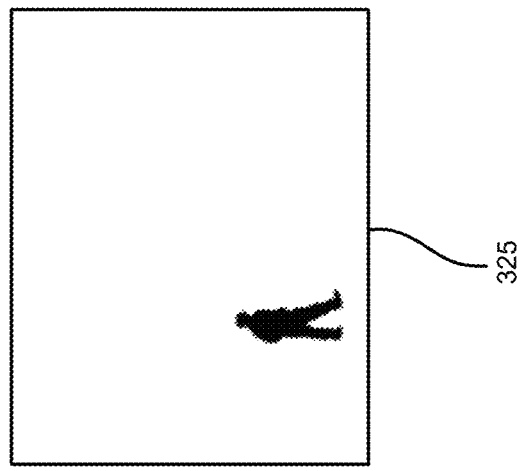
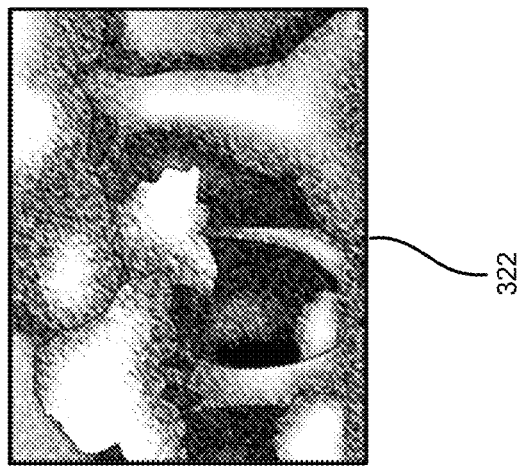
FIG. 3

LONG RANGE INFRARED IMAGER SYSTEMS AND METHODS

STATEMENT CONCERNING GOVERNMENT SPONSORED RESEARCH

Portions of the disclosed technology were developed with United States Government support under contract number W909MY-14-C-0003, awarded by the United States Army. The U.S. Government may have certain rights to technology disclosed herein pursuant to contract number W909MY-14-C-0003.

TECHNICAL FIELD

The disclosed technology relates generally to imaging, and more particularly, some embodiments of the present disclosure relate to systems and methods for combining imagery generated in whole or in part using different types of sensors (e.g., thermal and night vision imaging sensors), and/or combining imagery generated in whole or in part using one or more types of sensors with direct view imagery.

DESCRIPTION OF THE RELATED ART

In general prior art systems for clip-on optical overlay struggle with the ability to provide or work with continuous zoom optics while maintaining a small form factor and preserving optical resolution and acuity. Most prior solutions resort to electronic zoom (e-zoom) to meet demands for low size, weight, and power. However such solutions come at the cost of reduced performance, for example lower optical resolution and added digital latency.

One specific application of optical overlay involves the fusion of thermal, long-wave infrared (LWIR) imagery with low light (or night vision imagery). The primary method of combining thermal and night vision imagery is digital sensor fusion, such as in the Enhanced Night Vision Goggle (ENVG) family of products. Digital sensor fusion approaches must generally be tailored to each specific combination of sensors being fused (thermal, night vision, or otherwise), and the fusion process adds additional latency. In addition, digital fusion is immersive; that is, the user sees only a microdisplay and is limited to its resolution, frame rate, and latency. In dynamic applications the added latency and reduced situational awareness due to the immersive view can be prohibitive.

Current methods of optically combining thermal and night vision imagery make use of thermal imaging devices that clip-on a night vision system and provide an optical fusion image; here a combined optical overlay data and direct view. Conventional methods for providing optical fusion, such as front-end optical injection and beamsplitters, result in a loss of performance due to light loss or obstruction, which limits the system performance. Current clip-on thermal imager (COTI) systems are fixed focus and limited to unity magnification systems for use with existing Night Vision Goggles (NVG) [1,2]. This prevents use of COTI with rifle scopes, binoculars, and other high magnification systems in which providing a thermal image overlay provides a significant advantage.

BRIEF SUMMARY OF THE EMBODIMENTS

Systems of the present disclosure may include one or more of an optical overlay device, which may include one or more of an imaging optic to receive incoming light from a scene, and project at least a portion of the incoming light onto an imaging sensor; an imaging sensor to transduce into image data the light projected onto it by the imaging optic; a processing engine electrically coupled with a non-transitory computer readable medium having machine readable instructions stored thereon, which, when executed by the processing engine, cause the system to: generate a scaled overlay image based on the image data and a magnification parameter; a display device configured to project the scaled overlay image through a display optic toward a portion of a beam-combiner; a coupling mechanism to enable releasable attachment of the optical overlay device with a primary viewing device, wherein in an attached position at least a portion of the beam-combiner extends over at least a portion of a direct view optic of the primary viewing device, the direct view optic configured to receive a direct view of incoming light from the scene; and wherein the beam-combiner is configured to generate an optically fused image viewable by a user through the primary viewing device, the optically fused image representing a combination of the scaled overlay image and the direct view of the scene.

In some embodiments, the magnification parameter is an adjustable magnification state of the primary viewing device. In some embodiments, generating the scaled overlay image involves one or more of incrementing and decrementing, based on a detected magnification state of the primary viewing device, the number of pixels displayed horizontally and the number of pixels displayed vertically. In some embodiments, generating the scaled overlay image occurs responsive to a user actuation of a button coupled to the optical overlay device.

In some embodiments, the technology of the present disclosure may further include a sensor coupled with the primary viewing device and/or the overlay device, wherein generating the scaled overlay image occurs continuously, and/or is continuously adjusted responsive to the sensor detecting a change in a magnification state of the primary viewing device. In some embodiments, the sensor is configured to detect one or more of: a rotation angle of a magnification element of the primary viewing device, and a displacement position of a magnification element of the primary viewing device.

In some embodiments, the non-transitory computer readable medium further involves machine readable instructions stored thereon, which, when executed by the processor, cause the system to: adjust a position of the overlay image presented through the primary viewing device, the position adjustment occurring responsive to a change in the magnification state of the primary viewing device.

In some embodiments, the technology of the present disclosure may further include a periscope assembly optically coupled to the optical display device, the periscope configured to transmit the incoming light from the scene to the imaging optic of the optical overlay device, or vice versa.

In some embodiments, one or more of the periscope assembly and/or an imaging module is rotatably coupled to the optical overlay device such that the position of the periscope assembly and/or the imaging module about a primary axis of the optical overlay device is adjustable.

In some embodiments, the non-transitory computer readable medium involves machine readable instructions stored thereon, which, when executed by the processor, cause the system to: switch between a first viewing mode and a second viewing mode in response to a user selection, wherein in the first viewing mode the overlay image is presented as a semi-transparent image overlapping the direct view of the scene, and in the second viewing mode the overlay image is presented as an opaque image completely blocking the direct view of the scene.

In some embodiments, the non-transitory computer readable medium involves machine readable instructions stored thereon, which, when executed by the processor, cause the system to: switch between a first viewing mode and a second viewing mode in response to a user selection, wherein in the first viewing mode the overlay image is presented as an outline at least partially circumscribing an object within the direct view of the scene, and in the second viewing mode the overlay image is presented as a grayscale image covering at least a portion of the object within the direct view of the scene.

In some embodiments, the non-transitory computer readable medium involves machine readable instructions stored thereon, which, when executed by the processor, cause the system to: adjust a characteristic of the overlay image in response to a user selection, wherein the characteristic adjusted includes one or more of: brightness, contrast, image sharpness, and color.

In some embodiments, one or more methods of the present disclosure may include one or more of the following steps: providing an optical overlay device for attachment to a primary viewing device; receiving, at an imaging optic of the optical overlay device, incoming light from a scene; projecting at least a portion of the incoming light onto an imaging sensor of the optical overlay device; transducing, at the imaging sensor, the light projected onto the imaging sensor into image data; generating an overlay image based upon the image data; providing a beam-combiner extending over at least a portion of a direct view optic of the primary viewing device, the direct view optic configured to receive a direct view of incoming light from the scene; adjusting a scale parameter of the overlay image, the scale adjustment based upon a change in a magnification of a direct view of the scene by the primary viewing device; generating, via the beam-combiner, an optically fused image representing a combination of the scaled overlay image with a direct view of the scene; providing the optically fused image within a viewing plane of the primary viewing device; providing a magnification sensor, the magnification sensor coupled with the primary viewing device and the overlay device, wherein adjusting the scale of the overlay image occurs responsive to the magnification sensor detecting a change in a magnification state of the primary viewing device; adjusting a position of the overlay image presented through the primary viewing device, the position adjustment occurring responsive to the scale adjustment; switching between a first viewing mode and a second viewing mode in response to a user selection, wherein in the first viewing mode the overlay image is presented as a semi-transparent image overlapping the direct view of the scene, and in the second viewing mode the overlay image is presented as an opaque image completely blocking the direct view of the scene; switching between a first viewing mode and a second viewing mode in response to a user selection, wherein in the first viewing mode the overlay image is presented as an outline at least partially circumscribing an object within the direct view of the scene, and in the second viewing mode the overlay image is presented as a grayscale image covering at least a portion of the object within the direct view of the scene; detecting a target using one or more of overlay image information, geo-spatial information, imaging information, and visual information originating from an external source and transmitted to the optical overlay device; adjusting a characteristic of the overlay image in response to a user selection, wherein the characteristic adjusted includes one or more of: brightness, image sharpness, contrast, and color; providing a periscope assembly optically coupled with the display device such that the periscope projects the incoming light from the scene to the imaging optic of the optical overlay device, or vice versa; and/or automatically adjusting the overlay image based on one or more of geo-spatial information, imaging information, and visual information originating from an external source and transmitted to the optical overlay device.

In some embodiments, adjusting the scale of the overlay image comprises one or more of incrementing and decrementing the number of pixels displayed horizontally and the number of pixels displayed vertically. In some embodiments, adjusting the scale of the overlay image occurs responsive to a user actuation of a button coupled to the optical overlay device. In some embodiments, the magnification sensor is configured to detect one or more of: a rotation angle of a magnification element of the primary viewing device, and a displacement position of a magnification element of the primary viewing device. In some embodiments, the periscope assembly (and/or an interchangeable imagine module) is rotatably coupled to the optical overlay device such that the position of the periscope (and/or an interchangeable imagine module) assembly about a primary axis of the optical overlay device is adjustable.

In some embodiments, one or more methods of the present disclosure may include one or more of the following steps: providing an optical overlay device for attachment to a primary viewing device; generating a scaled overlay image based upon incoming light from a scene that is received through a portion of the optical overlay device; providing a beam-combiner extending over at least a portion of a direct view optic of the primary viewing device, the direct view optic configured to receive a direct view of incoming light from the scene; and/or generating, via the beam-combiner, an optically fused image representing a combination of the scaled overlay image with a direct view of the scene.

BRIEF DESCRIPTION OF THE DRAWINGS

The technology disclosed herein, in accordance with one or more various embodiments, is described in detail with reference to the included figures. The figures include drawings that are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 1 illustrates an example architecture of an Optical Overlay Device in accordance with one or more embodiments of the present disclosure.

FIG. 3 illustrates an example of optically fused data in accordance with one or more embodiments of the present disclosure.

Figure 2A:
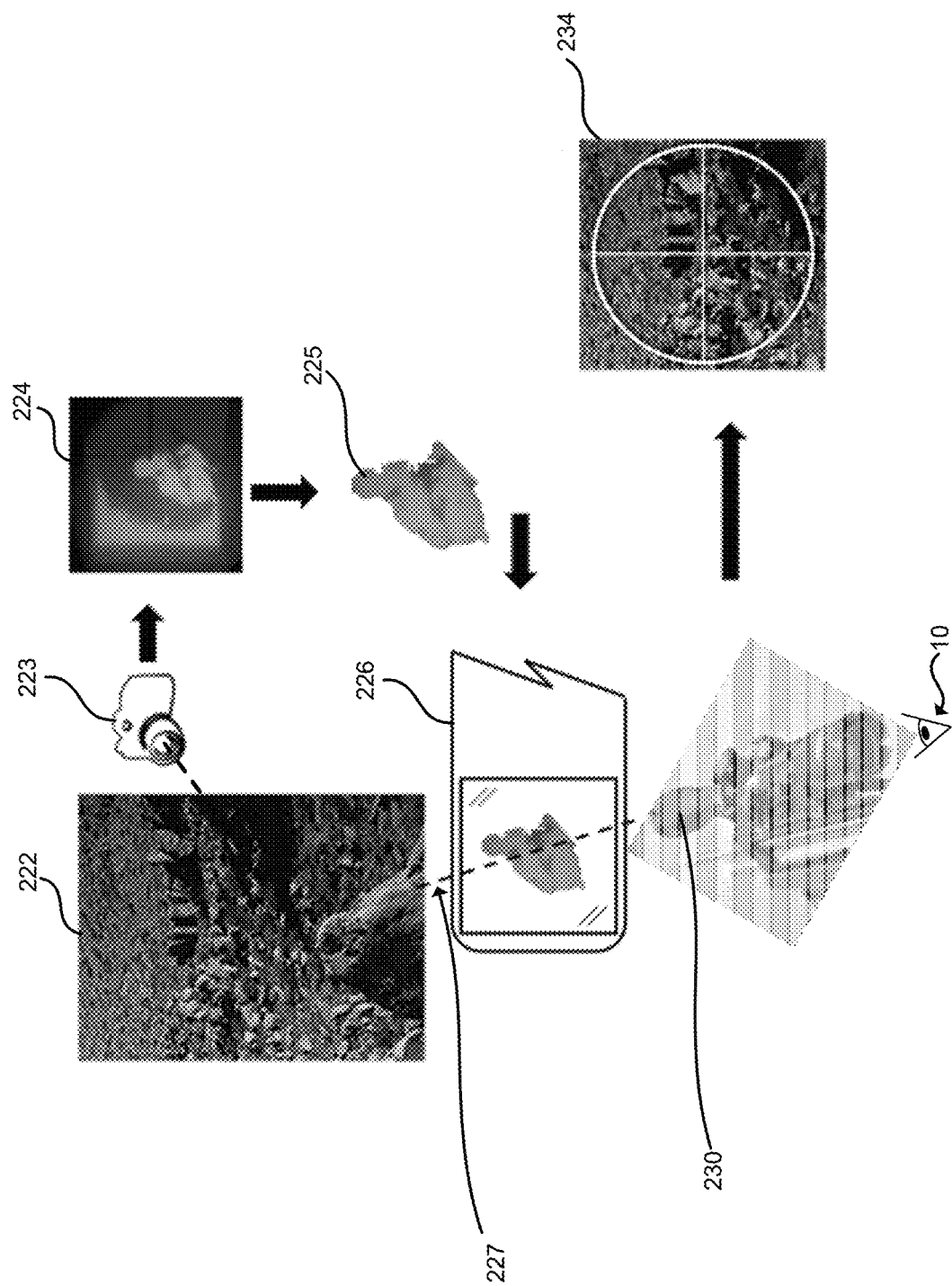
FIG. 2A illustrates an example diagram depicting of generating optically fused data in accordance with one or more embodiments of the present disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

According to various embodiments of the disclosed technology, a new, modular solution can be provided in various embodiments that allows use with interchangeable sensors (not limited to LWIR thermal overlays) while also providing variable magnification for various applications such as, for example, for use with rifle scopes and binoculars. In addition, embodiments can provide the capability to overlay data and symbols directly into the view of existing continuous magnification optics without requiring their modification (i.e., a retrofit design can be provided) in a compact, cost effective, and modular form factor.

Embodiments of the disclosed technology provide systems and methods for presenting sensor data and imagery in the view field of a primary viewing device such as a rifle scope, rifle sight, binocular, spotting scope, telescope, camera lens, or other optical imaging device. Specifically the imagery may be presented as a semi-transparent optical overlay in the viewfield registered with 1:1 scaling with the direct view through the primary viewing device in such a way as to maximize intuitive use and situational awareness as a consideration derived from human factors design guidelines.

FIG. 1 illustrates an example Optical Overlay Device System Architecture in accordance with one or more embodiments of the present disclosure. The optical overlay device 100 in this example accomplishes the optical image combination of a direct view 202 of a primary viewing device 200 with overlay data 203. The overlay data may be derived in various embodiments from sensors or communication equipment (not shown) or may consist of imagery data from the imager view 201 of an included imaging sensor 102 as viewed by its imaging optics 101. The imager view 201 may be rendered as a graphical overlay by electronic means of the display electronics 103 and display 104, and optionally modified and controlled by an included microcontroller 107. The overlay data 203 reprojected by the display 104 through display optics 105 may then be optically combined with the direct view 202 by means of an optical beam-combiner 106 to produce the final image product of combined direct and overlay data 204, hereafter referred to as the optically fused image. The optically fused image 204 may be viewed at a primary viewing device 200 by a human user 10. The optical overlay device 100 may be mechanically fastened rigidly in relation to the direct view optic by a clip-on mechanism 108, allowing repeated and repeatable device removal and attachment.

The optical overlay data 203, can include any one or more of images, graphics, symbols, maps, color overlays derived from images, and may also include symbology including text, symbols, and icons.

FIG. 2A illustrates an example of optically fused data that may be viewed at a beam-combiner optic (e.g., which may be positioned at or in optical relation to a viewing plane of a primary viewing device), in relation to a direct view of primary viewing device in accordance with one or more embodiments of the present disclosure. As shown, the optically fused data 234 may be generated by combining a direct view image as obtained through a primary viewing device with an overlay image generated in whole or in part from image data obtained from a sensor of a particular type (e.g., a thermal imager 223, as shown). In some embodiments, as shown in FIG. 2A, the imaging sensor is not physically coupled with the primary viewing device (e.g., no coupling or clip on mechanism 108 as shown in FIG. 1), and instead may be only communicatively coupled with such primary viewing device (e.g., over a wireless connection). That is, in some embodiments the systems of the present disclosure include an overlay imaging system that comprises one or more elements (introduced in FIG. 1), such as an imaging sensor 108 (e.g., included in the thermal imager 220 shown in FIG. 2A), that is not physically coupled with a primary viewing device 200 (e.g., the rifle scope 230 shown in FIG. 2A).

As shown in FIG. 2A, a direct view of a natural scene 222 may be received through an optic of a primary viewing device (e.g., the objective lens of the primary viewing device) such as an objective optic of rifle scope 230. Additionally, an imaged view of the natural scene may be captured by an imaging device, such as thermal imager 223, configured with an image sensor for capturing select information about the natural scene (e.g., the thermal/heat patterns detected as being radiated from the natural scene) and generating a thermal image 224. Image data generated by an image sensor may be modified before being fused with a direct view of a scene. For instance, as shown in FIG. 2A, the thermal image 224 is filtered in accordance with threshold criteria to generate the threshold image 225 (e.g., only radiation that exceeds a threshold amount of radiation within the long-infrared range of the electromagnetic spectrum will be retained, with the rest being filtered out). The threshold image 225 may then be fused with the direct view of the scene (e.g., a portion of the natural scene 222) via beam-combiner optic 226, generating an optically fused image 234 that a user 10 may view from a viewing plane of the primary viewing device 230 (or, in other embodiments, from another display such as a microdisplay).

Figure 2B:
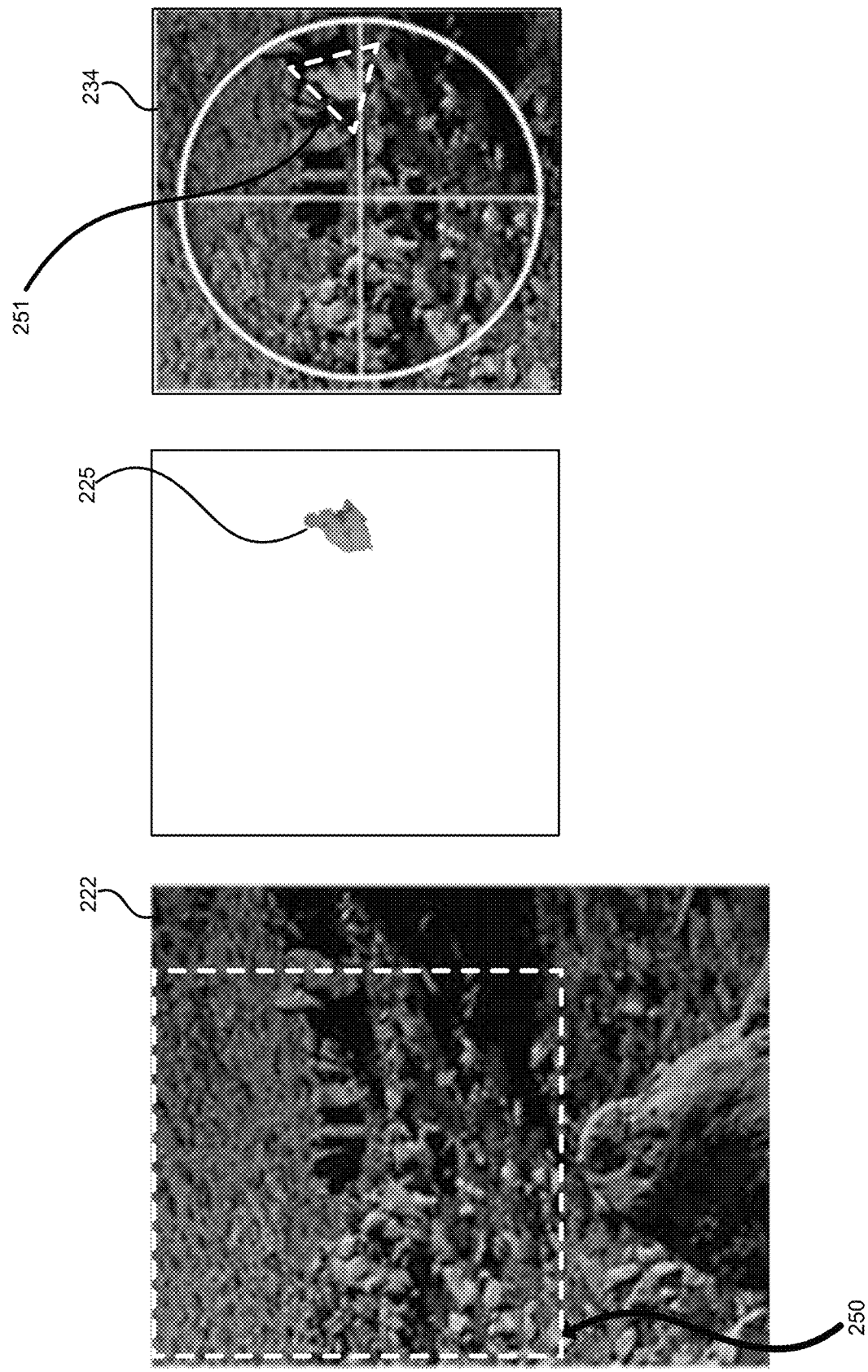
FIG. 2B illustrates a close-up view of the example natural scene, the example thermal threshold image, and the fused image for FIG. 2A.

FIG. 2B illustrates a close-up view of the natural scene 222, the thermal threshold image 225, and the fused image 234 from FIG. 2A. This close-up view is shown for clarity and to identify (i) what portion of the natural scene corresponds to the direct view imagery in the fused image 234, and (ii) where in the fused image 234 the thermal threshold image 225 appears. As shown, a round white dashed-outlined box 250 is shown over the natural scene 222, the white dashed-outlined box 250 generally designating the portion of the natural scene 222 that comprises the direct view imagery as received by the objective optic of the primary viewing device. Also as shown, a white dashed-outlined triangle 251 is shown over optically fused image 234, the white dashed-outlined triangle 251 generally designating the area within the optically fused image 234 where the threshold image 225 appears. In observing these images, one can appreciate that the optically fused image 234 provides much more data about the natural scene that might otherwise be perceived by viewing the natural scene through the primary viewing device alone. Indeed, comparing the direct view alone (generally denoted as the natural scene 222 falling within the white dashed-outlined box 250) with the fused image 234, it can be readily seen that the heat signature of an object (e.g., a person) is revealed in the fused image 234, where, by comparison, it appears to be hidden in the direct view alone.

In general, it should be appreciated from the present disclosure that the optical overlay data may be presented in any form, including in the form of an overlay that is a semi-transparent image or symbol, which may or may not be overlapped by or itself overlapping, in whole or in part, the direct view image or scene associated with the primary viewing device 200. This may be a preferred viewing method as opposed to viewing the digital image, which is opaque and replaces the view of the primary viewing device when observed through said device. Embodiments of the optical overlay device described herein may switch between view modes (semi-transparent and opaque) simply by blocking or revealing the direct view, 200.

A device that accomplishes the sensor data display via the overlay method is herein referred to as an optical overlay device. A device that accomplishes the sensor data display via an opaque digital image is herein referred to as a digital display device. When referring to both of the above in a manner so as not to distinguish the optical overlay and digital display configurations, the term optical display device is used.

In the case of the optical overlay device, the resulting view of the user through the device with overlay applied is referred to as the optically fused image 204, an example of which is shown in FIG. 3. Particularly, FIG. 3 displays an optically fused image as a product (sometimes referred to herein as a combination) of the direct view and the overlay view in accordance with one embodiment of the systems and methods described herein. As shown, direct view imagery 322 and image data 325 may be combined by a beam-combiner in accordance with one or more embodiments of the present disclosure, resulting in optically fused image 234. As shown, the optically fused image 334 contains a higher level of information content and may be displayed in a format that is easier for the user to perceive (e.g., represented in the fused image 334 by the whited-out image of the person that was earlier imaged as depicted in image data 325). This can result in a heightened visual sense, reducing time for visual scanning and acquisition tasks, and improving reaction time and reaction accuracy. In this way, observation of the optically fused image can achieve for the user a state of augmented reality. Such is not specifically the case with the digital display device as the direct view image information is forfeited in exchange for the digital imagery provided on the display. There may be an exception that has been achieved in prior work in which the imagery on a digital display device has previously been digitally fused to increase information content. But this digital fusion is a less suitable method than optical fusion, however, due to increased requirements for electronic image processing requiring power, adding latency, and increasing size.

The optical overlay data may be color coded in some embodiments to improve contrast with the direct view scene onto which it is overlaid. The brightness and contrast of the display can be adjusted to emphasize the direct view or the optical overlay data. The brightness and contrast can also be adjusted, for instance through a button control interface to the microcontroller, to provide an threshold image where a binary filter [0,1] is applied to the grayscale image to highlight only those objects in the overlay above a programmable and variable threshold. This can improve the user's detection capability under all lighting conditions. The brightness and contrast can also be adjusted to provide a continuous grayscale image. This can provide the ability to see and navigate when the primary viewing device alone is unsuitable, e.g., when in total darkness. An outline mode can be applied for overlay when viewing under optical fusion conditions to preserve resolution and color contrast of the original direct view image.

Figure 4:
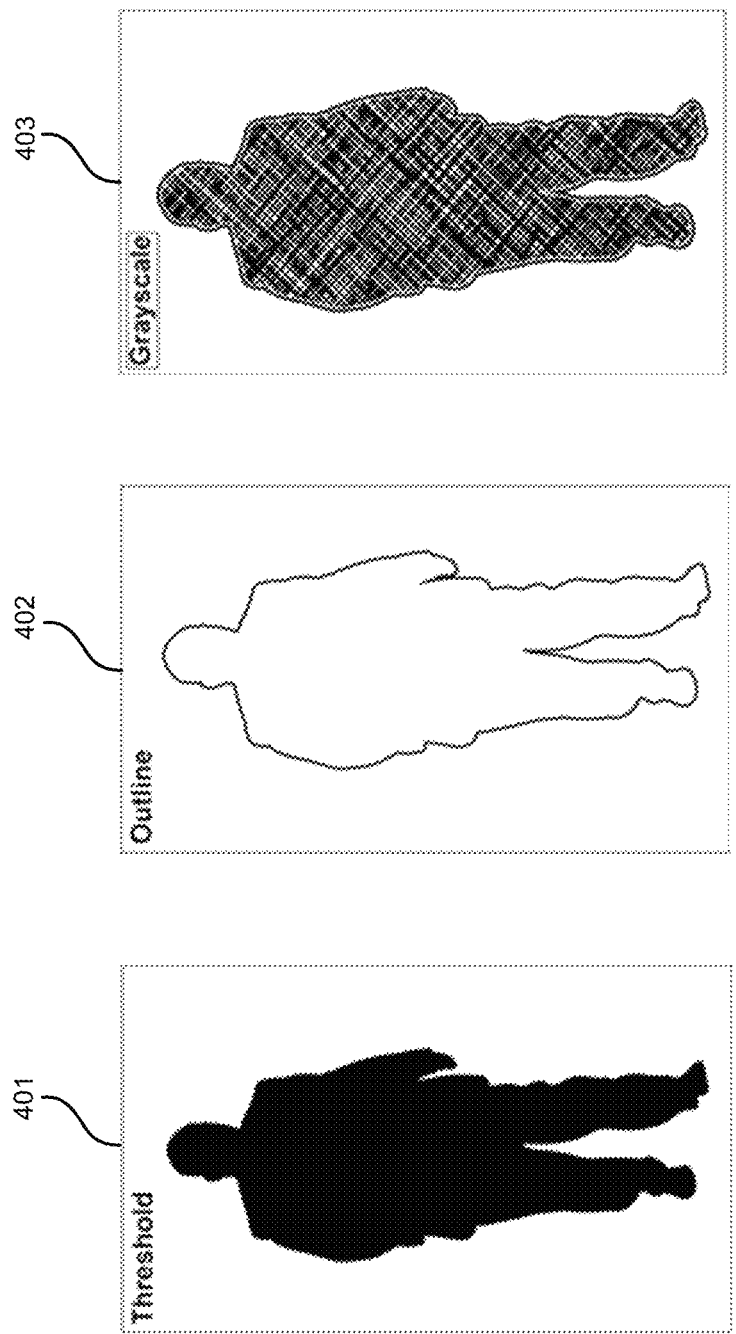
FIG. 4 illustrates an example threshold image, and example outline image, and an example grayscale image illustrating features of an adjustable optical overlay viewing modes—to improve optically fused image quality—in accordance with one or more embodiments of the present disclosure.

An example of such viewing conditions are illustrated in FIG. 4, which illustrates adjustable optical overlay viewing modes to improve optically fused image quality in accordance with one embodiment of the systems and methods described herein. As shown, image 401 represents an example threshold image of an object (here, an blacked-out figure of a human) in accordance with one or more embodiments of the present disclosure; image 402 represents an example outline image in accordance with one or more embodiments of the present disclosure; and image 403 represents an example grayscale image in accordance with one or more embodiments of the present disclosure.

The overlay view for the optical display device may be presented by a display of an optical overlay device. Examples of display technology can include compact display technology or a microdisplay, including technologies such as organic light emitting diode (OLED), liquid crystal display (LCD), liquid crystal on silicon, or digital light processing (DLP) displays, preferably with diagonal dimensions on the scale of 6-25 mm.

In the case of the example optical overlay device 100 introduced in FIG. 1, the overlay data 203 may be relayed through display optics 105 and an optical beam-combiner 106 to create a virtual image at the image plane of the user's eye 10. In one embodiment, the virtual image is viewable by the user's naked eye (unaided viewing) or through a primary viewing device at a wide range of magnification values (2×-4× zoom range preferred, 1×-6× and 3×-24× less preferred). In various embodiments, a change of the magnification setting on the primary viewing device 200 does not require physical adjustments to one or more of the display 104, display optics 105, or beam-combiner 106 optics, such as changes in position or orientation, to achieve proper positioning and 1:1 direct view and overlay view size scaling. The display 104 may present monochrome, (continuous) color, or a set of discrete colors (i.e., multiple wavelengths) to meet brightness and contrast requirements of a user in different ambient lighting conditions (e.g., indoor/outdoor, daytime/nighttime, full sun to complete darkness, overcast moonless night, etc.).

The optical beam-combiner 106 may include the use of partially-reflective beam-combining optics (partially metalized mirrors), color-selective (dichroic) beam-combiners, free-form prisms, and diffractive optical elements to include diffraction gratings and holographic optical elements, among other structures. The optical beam-combiner may include the use of a waveguide or periscope structure to extend/adjust the distance between the display optic path and the primary viewing optic path to any distance. For example, in some embodiments a waveguide or periscope structure may be employed to extend the distance between 20-60 mm, between 60-80 mm, between 10-20 mm, between 80-100 mm, or any other range of distances desired for a given application. In general, keeping this distance small may help to reduce imagery offsets due to parallax, for example, which will inherently be minimal when viewing objects at long range (e.g., at distances greater than 100 meters).

Figure 5:
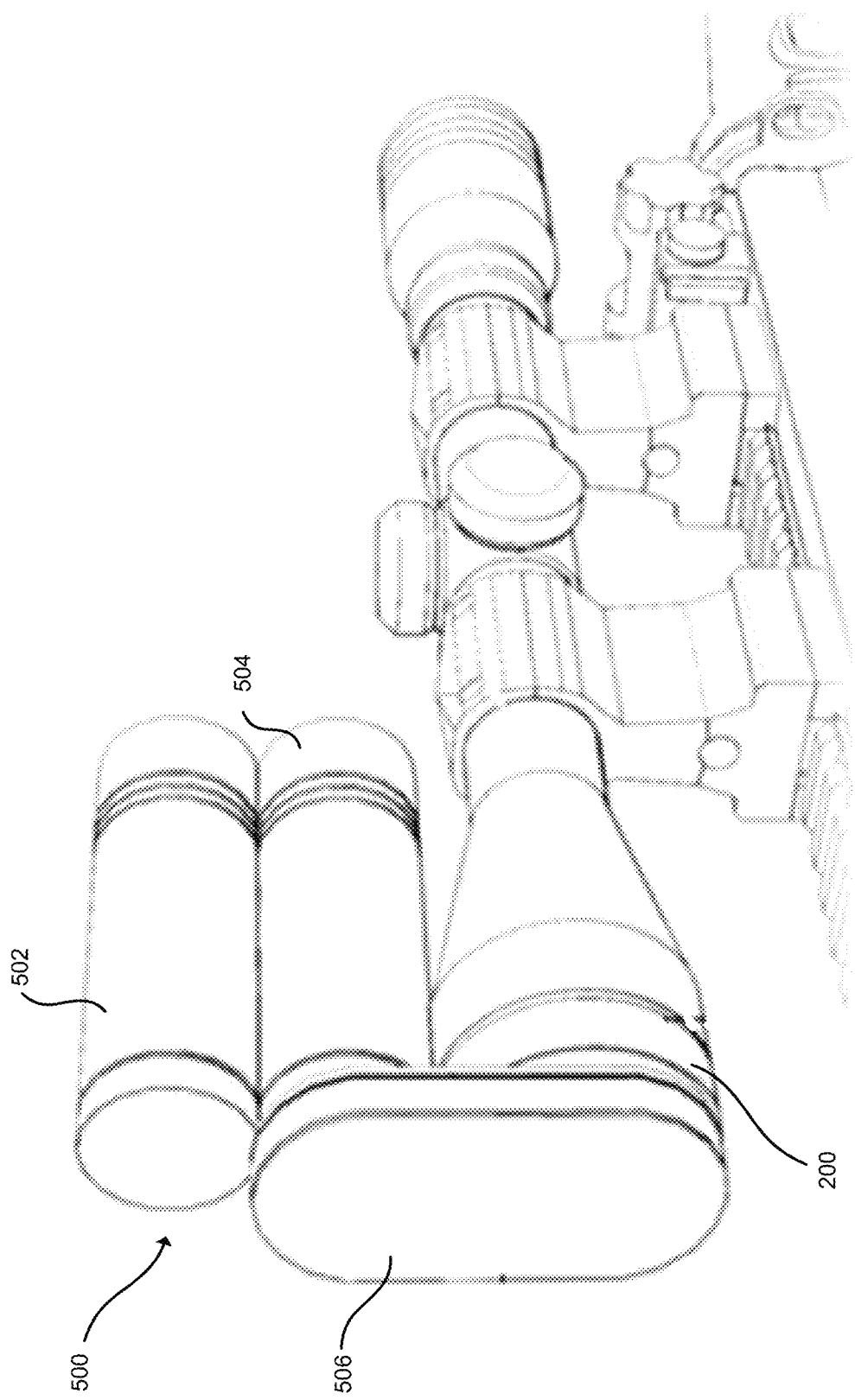
FIG. 5 illustrates an example arrangement wherein the beam-combiner optic is positioned in front of a primary viewing device in accordance with one embodiment of the systems and methods described herein

The optical beam-combiner 106 may be positioned in front of the objective of the primary viewing device (an example of which is shown in FIG. 5), or behind the primary viewing device.

FIG. 5 illustrates an example arrangement of an optical overlay device 500 wherein the beam-combiner optic 106 is positioned in front of a primary viewing device 200 in accordance with one embodiment of the systems and methods described herein. As shown, the example primary viewing device 200 comprises a scope fixed to a rifle. The depiction illustrates that a beam combiner optic 506 of an optical overlay device may be positioned in front of the objective optic of the primary viewing device 200. Also shown, an imaging module 502 (e.g., a thermal imager) may be coupled with display portion 504 and beam combiner portion 506, among other elements of the optical overlay device 500. The beam-combiner portion 506 is a waveguide, and may in some instances be considered a periscope.

The image data, whether overlayed or digitally displayed, may be presented in the view field of devices providing non-unity optical power (i.e., magnification), or for unity magnification, (i.e., un-magnified devices). Use with non-unity devices may include, for example, riflescopes, spotting scopes, and binoculars; and unity devices include, for example, head mounted optics, night vision goggles, and optical visors on helmets.

The size of the overlay data, especially overlay imagery data, may be adjusted electronically or optically such that the scale with the direct view scene is at a desired level such as, for example, at a 1:1 proportion to the direct view. This optimal scaling consideration takes into account the natural preference of the human user and human factors engineering.

The size scaling adjustment to achieve optimal size scaling may be automated in such a way to reduce inputs and adjustments from a human user. One example method of achieving size scaling is electronic automatic adjustment whereby the size of the image on the display in terms of the total pixels displayed horizontally and pixels displayed vertically is incremented or decremented. The size scaling of the display can be performed according to the polyphase filter, or other video scaling algorithms including bicubic and bilinear, to reduce computational time.

The total number of pixels may be incremented in the case of decreasing magnification (zoom out) of the primary direct view optics in order to present a larger display image, while maintaining the 1:1 optimal scaling. The total number of pixels may be decremented in the case of increasing magnification (zoom in) of the primary direct view optics in order to present a larger display image, while maintaining the 1:1 optimal scaling. Properly performed, electronic adjustment in such a manner may eliminate the need for an optical adjustment of the display overlay optics and the need for variable focal length optical components from the display optics device subassembly.

This approach can be implemented to eliminate the need for variable focal length optics from the display optics subassembly which improves several aspects of the device including size and weight reductions, elimination of moving parts, reduced complexity, reduced tolerances, and improved reliability.

The extent to which the display size is incremented or decremented may be provided by a scaling algorithm, which may take into account the field of view of the direct view optics and the image overlay. The scaling may be performed manually (manual electronic input, e.g., button push), or mechanically, such as through the use of a rotary encoder, optical encoder, or other electronic position or rotation sensor to relay data on the clip-on sensor state (magnification, rotation angle, displacement position). Such an electronic sensor may also be attached to the primary direct view optic to relay the same information for electronic display adjustment. Display adjustment can include shifting the symbology and icons in the data overlay to remain in the field-of-view and at the periphery of the direct view, thus enabling symbolic overlays to be seen at high magnifications settings. Electronic control of the data overlay size and position based on user or sensor input can be accomplished within the device using the microcontroller 107 in the system architecture.

In some embodiments, the scaling of the display image is semi-continuous in nature, corresponding for example to bit-wise $2^3$ to $2^{16}$ size increments in total horizontal or total vertical display sizes. In this way the electronic automatic scaling proceeds in a way which is analogous to the continuous optical zoom properties of direct view telescopic optics. As a result, the optical display device provides a continuous optical zoom capability.

In various embodiments, the image sensor can be implemented such that the size of the image sensor is smaller or equivalent to that of the microdisplay, for instance a 320×240 sensor and a 1280×960 display such that image from the sensor can be displayed at 1:1 or incrementally scaled up to 1:4 in sensor pixel-to-display pixel number ratio. This scaling may be discrete using pixel multiplication, or continuous by applying interpolation algorithms. The ratio of display size to sensor size may provide the practical limitation to the zoom range that can be optimally matched in scaling between the direct view scene and the overlay.

When scaling, the display position of the sensor image on the microdisplay may be controlled (e.g., centered, justified toward an edge of the microdisplay) at all scaling ratios by applying an operation to shift the image pixel-by-pixel in some embodiments. This operation can, for example, keep the center sensor pixel at a given magnification within a predefined number of pixels (e.g., two pixels) horizontally and vertically of the physical center of display. Additionally, providing a user interface (such as a button) allows shifting the image pixel-by-pixel to adjust alignment with the direct view scene to improve overlay fidelity, or for calibration or bore-sighting.

Figure 6:
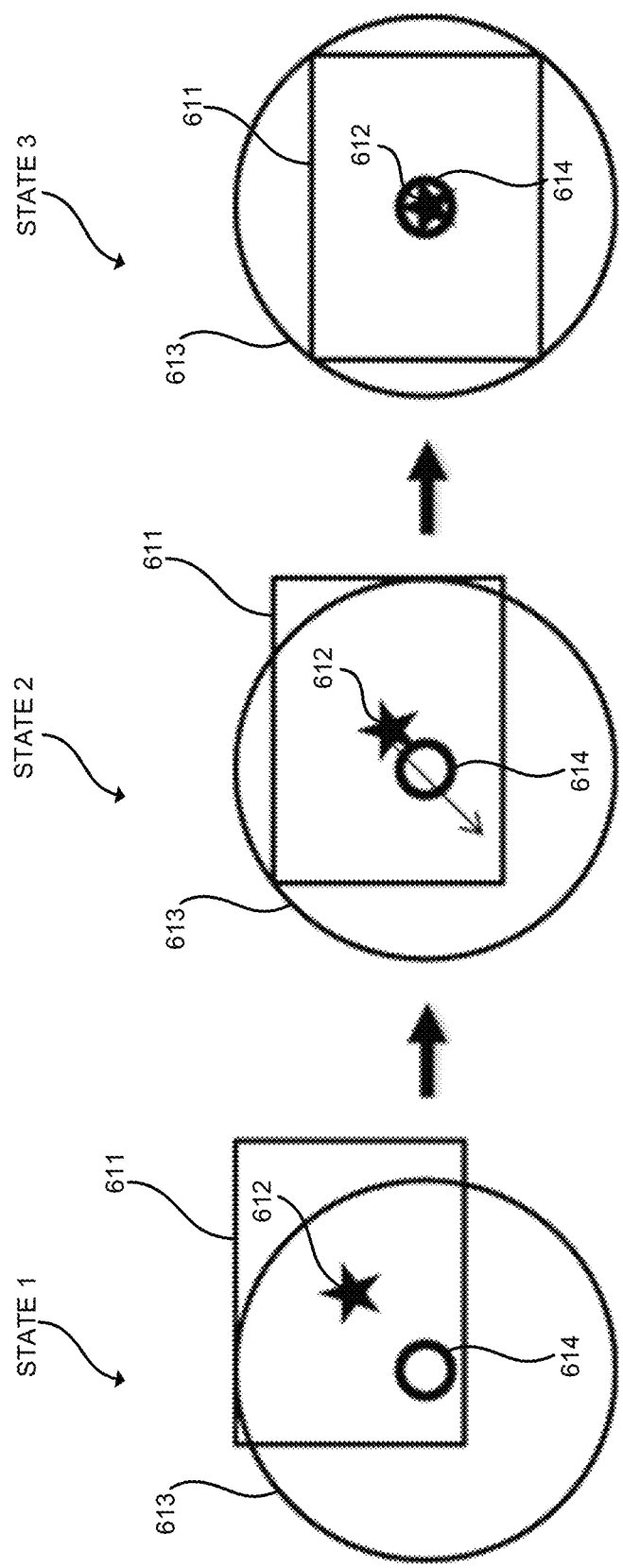
FIG. 6 illustrates image overlay position adjustment operations in accordance with one or more embodiments of the present disclosure.

FIG. 6 illustrates an example of a digital bore-sighting operation accomplished through pixel shifting to move the center 612 (the star) of the overlay image 611 onto the center 614 (the ring) of the direct view 613 in accordance with one embodiment of the systems and methods described herein. As shown in progression from state 1 through state 3, in state 1 the overlay image 611 is positioned upward and to the right of direct view 613. The aforementioned position control operations can shift overlay image 611 downward and to the left (as shown by the arrow in stage 2), until the center 612 of the overlay image 611 is aligned with, or substantially aligned with, the center 614 of the direct view 613.

As an optical overlay device, embodiments of the present disclosure can be implemented that provide the ability to continuously zoom the overlay image. This characteristic makes the optical overlay device compatible with continuous zoom primary view optics, as opposed to prior solutions that were suitable for unity or fixed magnification only.

In embodiments where optical overlay device is mechanically attached to the primary direct view optic, such attachment may be accomplished by means of a clip-on method using any coupling mechanism, such as the clip-on mechanism 108 shown symbolically in FIG. 1. Other coupling/attachment mechanisms can be used such as, for example, threaded attachment mechanisms, snap mechanisms, bayonet mounts, magnetic mounts and so on. Accordingly although the act of attachment is referred to as clipping-on, the mechanism and fastening operation may involve tightening of knobs, closing of clasps, or screwing a threaded attachment. Clip-on mechanisms and methods vary depending on primary optic type, size, and location relative to user. The use of the optical overlay device in this clip-on configuration is therefore enables one to retro-fit to the resulting clip-on device to existing or new primary direct view optical devices. The purpose of the clip-on mechanic is to place the beam-combining optic in-line with the direct view of the primary viewing device in a secure and repeatable manner.

For the case of attachment to a riflescope, for example, in one embodiment, the clip-on device may be attached to the riflescope rail using for instance the Picatinny or Weaver (MIL-STD-1913) mounts, although other mounts and coupling mechanisms can be used. This attachment may be, for example, to a primary rail, extended rail, quad extension rail, or scope ring with rail segment, as well as essentially equivalent mounting locations, or any other location. The clip-on device may include a rail adapter mechanism commonly used in the field such as one or more knobs and quick-disconnect (QD) connectors. In another embodiment the device attaches onto the primary direct view optic with a modified scope ring. In some embodiments, mounting position the optical beam-combining device directly in front and covering (or substantially covering) the objective of the primary direct view optic device, so as to optimize optical image fusion quality and alignment.

By providing multiple mounting positions/brackets on the clip-on device, the optical overlay device can be attached in multiple positions and configurations to suit the user's preference or operational needs. This may include along the extended rail to the left or right side, parallel to the left or right side of the primary direct view optic, or above or below the primary direct view optic. In this way the clip-on device can meet user needs for left/right handedness, left/right eye use, viewing optic/rifle balance, and may also minimize interferences with other devices or equipment.

Figure 7:
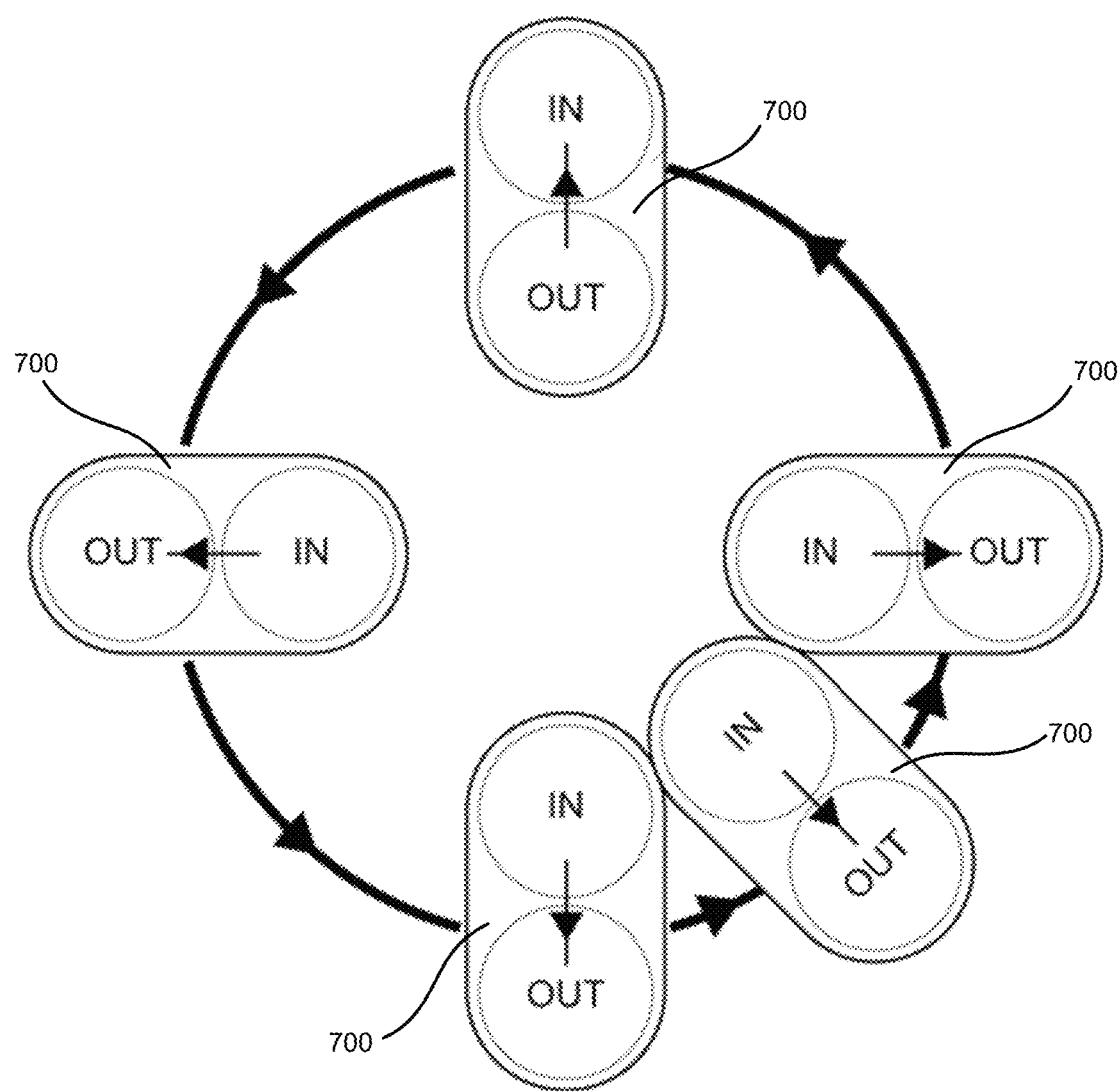
FIG. 7 illustrates an example of a beam combiner periscope optic in accordance with one or more embodiments of the present disclosure, such as a waveguide optic, that allows rotation around the central display axis.

The use of periscope or waveguide optics that function by translating the image along their longitudinal axis increase the number of possible configurations for the clip-on device when used for optical overlay. FIG. 7 illustrates a symbolic example of a beam combiner periscope optic 700 in accordance with one or more embodiments of the present disclosure, such as a waveguide optic, that allows rotation of at least a portion of the beam combiner periscope optic 700 around a central display axis in accordance with one embodiment of the systems and methods described herein. In such a configuration the periscope can be attached to pivot along the display optical axis on the input face allowing free rotation of the output face, or vice versa. Such a configuration enables several additional mounting configurations, as well as convenient positions for clip-on device stowage when not in use (on the weapon) or when not attached (e.g., in a rucksack, backpack, or container).

FIGS. 8A-8D illustrate example mounting configurations for an optical beam-combining device, and showing example adaptation of periscope optic orientation relative to the various mounting cases, in accordance with one or more embodiments of the systems and methods described herein. Placing the display lens within the rotating joint which attaches to the beam-combining optic is a specific aspect that can result in a more compact assembly.

Figure 8A:
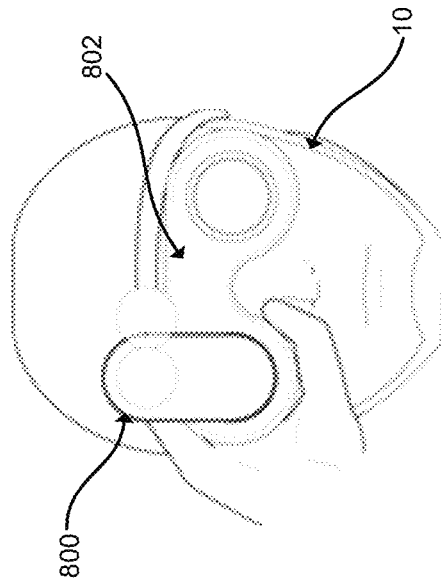
FIG. 8A illustrates a first example mounting configuration showing a first adaptation to a mounting case in accordance with one or more embodiments of the present disclosure.

FIG. 8A illustrates a first example mounting configuration showing a first example adaptation of a mounting case such that the beam combiner periscope optic 800 is positioned in a first orientation in accordance with one or more embodiments of the present disclosure. As shown, the periscope segment can be rotatably attached, allowing free rotation about the central display axis of the beam combiner periscope optic 800, which is mounted to the primary viewing device 802 in a first orientation, positioned via a rotating joint circumscribing a display lens of the primary viewing device. The user 10 in FIG. 8A can manually rotate the periscope input component about the rotating joint.

Figure 8B:
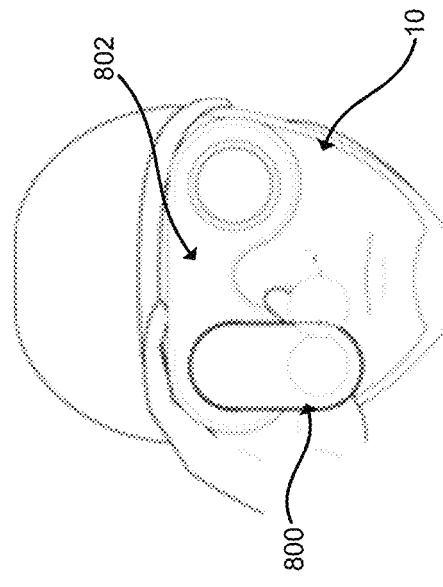
FIG. 8B illustrates a second example mounting configuration showing a second adaptation to a mounting case in accordance with one or more embodiments of the present disclosure.
Figure 8C:
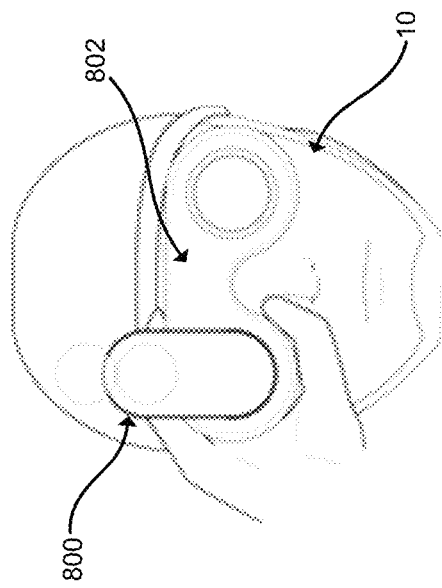
FIG. 8C illustrates a third example mounting configuration showing a third adaptation to a mounting case in accordance with one or more embodiments of the present disclosure.
Figure 8D:
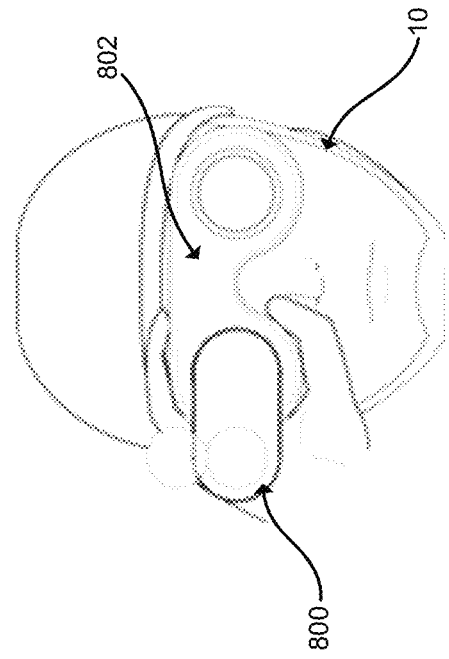
FIG. 8D illustrates a fourth example mounting configuration showing a fourth adaptation to a mounting case in accordance with one or more embodiments of the present disclosure.

FIG. 8B illustrates a second example mounting configuration showing a second example adaptation of a mounting case such that the beam combiner periscope optic 800 assumes a second orientation in accordance with one or more embodiments of the present disclosure. As shown, the periscope segment can be rotatably attached, allowing free rotation about the central display axis of the beam combiner periscope optic 800, which is mounted to the primary viewing device 802 as shown. The user 10 in FIG. 8B can manually rotate the periscope input component about the rotating joint.

FIG. 8B illustrates a third example mounting configuration showing a third example adaptation of a mounting case such that the beam combiner periscope optic 800 assumes a third orientation in accordance with one or more embodiments of the present disclosure. As shown, the periscope segment can be rotatably attached, allowing free rotation about the central display axis of the beam combiner periscope optic 800, which is mounted to the primary viewing device 802 as shown. The user 10 in FIG. 8C can manually rotate the periscope input component about the rotating joint.

FIG. 8B illustrates a fourth example mounting configuration showing a fourth example adaptation of a mounting case such that the beam combiner periscope optic 800 assumes a fourth orientation in accordance with one or more embodiments of the present disclosure. As shown, the periscope segment can be rotatably attached, allowing free rotation about the central display axis of the beam combiner periscope optic 800, which is mounted to the primary viewing device 802 as shown. The user 10 in FIG. 8D can manually rotate the periscope input component about the rotating joint.

By including mechanical attachment points on the input face of the beam-combining optic, additional components can be threaded in front of the primary direct view optic including, for example, optical filters, glare reducing components, anti-reflection devices, protective caps, and polarizers.

The optical overlay image may be generated by any type of imaging sensor, deployed onboard or offboard, and relayed via a wired or wireless communications interface to a microdisplay. Nonlimiting examples of imaging sensors may include, for example, sensors sensitive to portions of the electromagnetic spectrum that are invisible to the naked, unaided eye of a human user, such as near-infrared (NIR 800-1000 nm), short-wave infrared (SWIR 1000-3000 nm), mid-wave infrared (MWIR 3000-5000 nm), and long-wave infrared (LWIR 7500-14000 nm), as well as ultraviolet (UV 300-400 nm). Image sensors may also include sensors sensitive to other portions of the electromagnetic spectrum. Imaging sensors may also include enhanced optical sensors such as high-speed gated imagers for visualizing faint or modulated signals, image intensifiers (I2) or digital night vision sensors for low light imaging, and image sensors utilizing advanced image processing for computer-aided recognition, identification, and tracking (for instances of faces, license plates, vehicle types, for example). For the above cases an image product (e.g., thresholded image, bounding box surrounding a target of interest, shape outline, laser spot location) may be furnished and relayed to the microdisplay for overlay on the direct view. The image product may be the source of additional information for the optical overlay to accomplish augmented reality.

In some embodiments a single device including an imaging sensor paired with display optical subassembly may constitute the clip-on device. In other embodiments the clip-on device may consist of the display optical subassembly and the imaging sensor may be modular and interchangeable as a separate subassembly, thus making the clip-on reconfigurable.

Figure 9B:
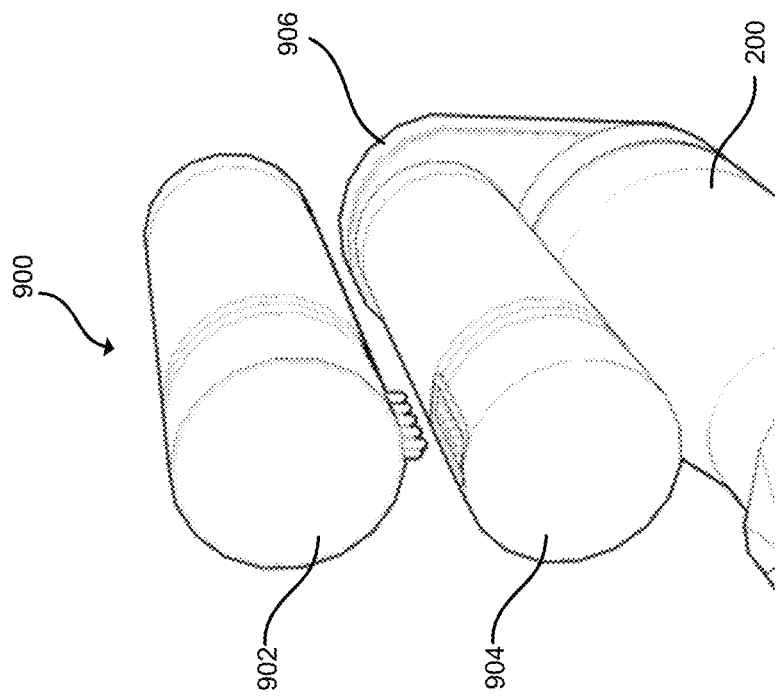
FIG. 9B illustrates the interchangeable imager module in a detached condition relative to a display portion and a beam-combining portion of an example optical display device, in accordance with one or more embodiments of the present disclosure.
Figure 9A:
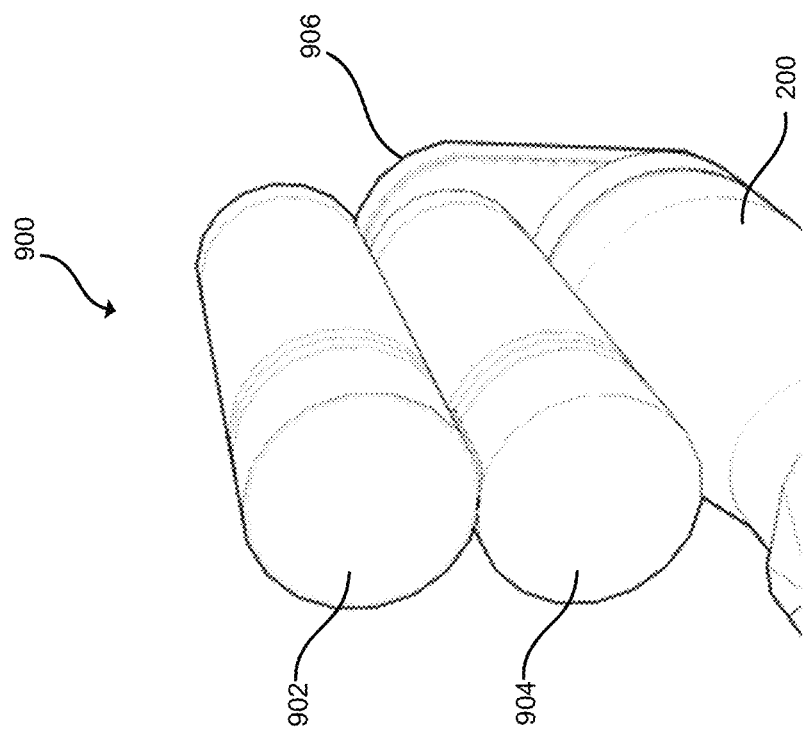
FIG. 9A illustrates the interchangeable imager module in an attached condition relative to a display portion and a beam-combining portion of an example optical display device, in accordance with one or more embodiments of the present disclosure.

An example of this is shown in FIGS. 9A and 9B, which show a reconfigurable optical overlay device 900 coupled to a primary viewing device 200 (e.g., a rifle scope), the reconfigurability accomplished using an interchangeable imager module 902 that mates to the display portion 904 and beam-combining portion 906 of the optical overlay device 900 in accordance with one embodiment of the systems and methods described herein. In this example, the display portion 904 and beam-combining portion 906 of the optical overlay device 900 remain fixed with respect to the primary viewing device 200 independently of the attached/detached condition of the interchangeable imager module 902. FIG. 9A illustrates the interchangeable imager module 902 in an attached condition relative to the display portion 904 and beam-combining portion 906 of the example optical display device 900, in accordance with one or more embodiments of the present disclosure. FIG. 9B illustrates the interchangeable imager module 902 in a detached condition relative to the display portion 904 and beam-combining portion 906 of the example optical display device 900, in accordance with one or more embodiments of the present disclosure.

When used with a continuous optical zoom imaging sensor, an encoder or similar device may be applied to determine the optical zoom setting and to command a display scaling operation, for example the display scaling operations described above. In this way the optical overlay device may accomplish a continuous optical zoom for the overlay optics, preserving optical resolution in terms of pixels on target and pixels observed by the eye through the direct view optic, which increase ranges for target acquisition tasks commonly referred to as ranges for detect, recognize, and identify (DRI) tasks.

The microdisplay may include in various embodiments a video output and driver (analog or digital format) for interfacing (wired or wireless) a duplicate image for digital display on an external display or monitor, e.g., a secondary helmet mounted display (HMD) on the same user, or as a relay to another nearby individual (e.g., between a sniper and spotter on a sniper team) within 1 to 20 feet. The image once acquired and subsequently stored and or transmitted is referred to as the captured image.

This can be implemented to enable two individuals to share the same view point to more quickly acquire and identify targets or locations by exchanging and comparing captured images with their direct view via inspection of the captured image. The captured image may be presented in the optical display device in an optical overlay (semi-transparent) or digital display (opaque) format.

In some embodiments, the system can use the onboard encoder to determine the zoom level of the scope on which the image was captured, and compare this to the zoom level of the scope onto which the wirelessly transmitted captured image is to be displayed via overlay, to scale the size of the captured image digitally via the linked zoom mechanism. For example, if the image is captured on a device with a field-of-view of 5 degrees, when displayed on a device with a field-of-view of 10 degrees the image will be scaled down by a factor of two on the display to present it scaled 1:1 with the direct view for proper registration.

Figure 10:
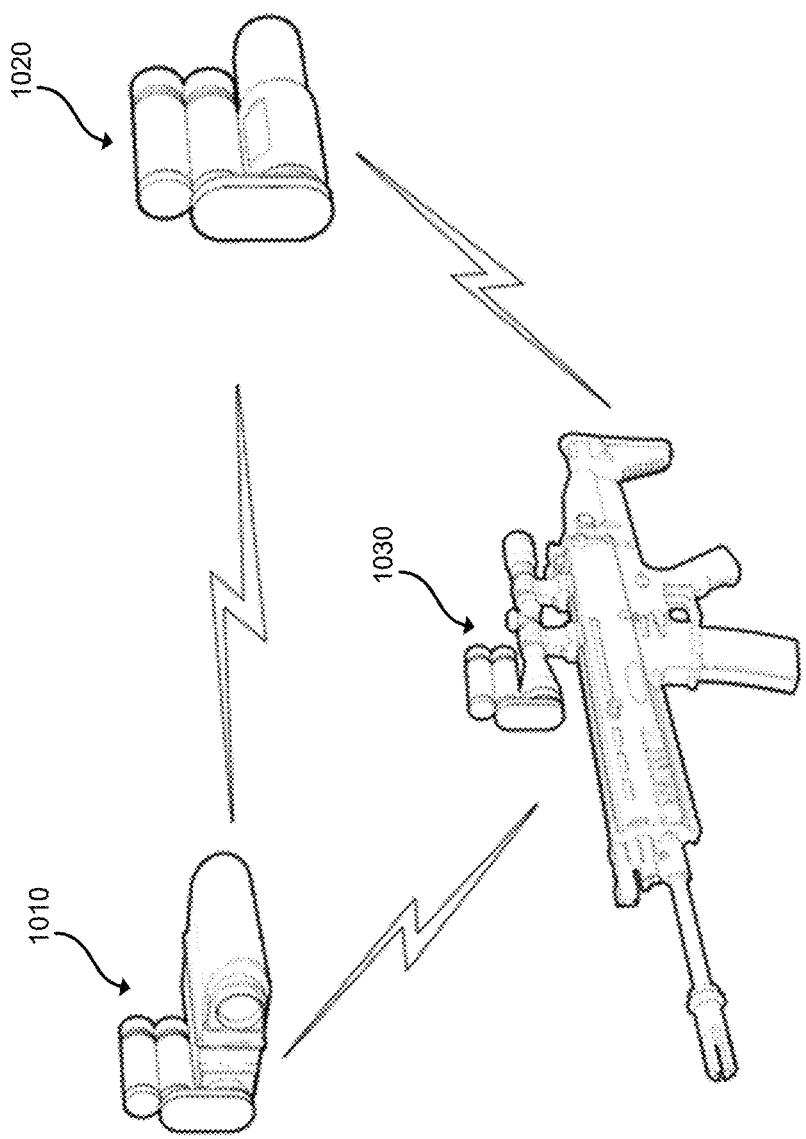
FIG. 10 illustrates geo-registration, transmission and presentation in accordance with one embodiment of the systems and methods described herein.

Using elements such as a GPS, compass, and inertial sensors onboard the clip-on device and a range-finder or other like device attached to the weapon or other host platform, with data relayed to the optical fusion device, the device can provide the capability to determine and tag the absolute location of captured still images to the degree of accuracy allowed by the system elements. The location of the target as defined by the reticle location in azimuth and elevation, and at the range specified by the rangefinder and the shooter's GPS coordinates may be stored as metadata with each single frame of captured image. Due to the narrow field of view of direct view optics, especially high magnification optics (cf. "soda straw view"), the area of observation can be accurately defined. This is in contrast to wide-field-of-view displays such as helmet-mounted displays (HMDs) where the gaze direction can obfuscate determination of the true target location. Captured imagery along with the GPS position, compass bearing, azimuth and elevation angles, and target range metadata may be used to furnish geo-registered imagery. An example of this is shown in FIG. 10, which illustrates geo-registration, transmission and presentation in accordance with one embodiment of the systems and methods described herein. As shown, any one or more of GPS information, compass bearing information, azimuth angles, elevation angles, and target range data, among other data, may be furnished between optical overlay devices 1010, 1020, and 1030 (one or more of which may have known positions/locations/orientations) to accomplish enhanced geo-registration, transmission, and presentation with respect to one or more optical overlay devices attached to a non-stationary primary viewing device such as a scope on a rifle (e.g., optical overlay device 1030), in accordance with one or more embodiments of the present disclosure.

Individual geo-registered images can be tiled together in a mosaic fashion using, for example, feature matching and registration algorithms common in modern panoramic photo software to produce a captured geo-registered image of a larger size. Captured geo-registered images (individual or large size) can be shared with another user wirelessly (the recipient) who can then review the data through their own optical fusion device and direct view optic. Using the recipient's relative GPS location, compass bearing, inertial data, and range data, the captured can be presented only as an overlay when the recipient positions the view field of the direct view optic in the vicinity of the viewing area of the individual that captured the image (as illustrated in the example of FIG. 10).

This process can be initiated by the selection of a view-finder mode by the recipient. In view-finder mode, while misaligned from the target location, the optical fusion device can present graphical indicators such as arrows, bars, or lines to guide the viewer into proper alignment with the view of the selected captured image location. Several such captured images can be loaded simultaneously allowing the recipient to survey a larger scene and observe several separate views transmitted to him/her from different locations and users. The geo-registered captured data can be simultaneously presented on a large screen in a command and control (C2) scenarios for situational awareness of multiple in-scope views, including the possibility of fusing multiple perspectives of the same location from different viewing locations.

A captured image can be compared to the current direct view scene using, for example, image subtraction and change detection methods to highlight and emphasizes features. This may be achieved by comparing two images from the same device or those exchanged/transmitted between devices. The use of geo-registration may improve localization accuracy and feature matching in the case that geo-registered images are available. Change detection can be used to detect (slowly) moving or emerging targets, detect hazards such as explosive or IED emplacements, or as a step in multiple-step automatic target recognition (ATR) algorithms.

By using target range data and ballistic data (including but not limited to bullet velocity, pressure, altitude, air density) the time of flight to target, and hence impact time of the bullet with the target from trigger pull at t=0 can be calculated. Using an appropriately triggered and sufficiently high frame rate imager as part of the clip-on device, the acquisition of a single or multi-frame burst of images can be taken at the impact time. These impact images can be reviewed for various purpose such as battle damage assessment. For example, the impact images can be overlayed and reviewed against the scene subsequently, or subtracted from a properly registered view for change detection to assist with battle damage assessment.

The sufficient case for optically fused image scaling may be defined by a mismatch between the relative direct view optic field-of-view and the field-of-view of the sensor in the clip-on device. The field-of-views of the sensor and display may be equivalent for 1:1 scaling, for example. If linked zoom is disabled, then when the direct view optic is zoomed, the direct view may cover a reduced portion the display and sensor fields of view (scaling remains 1:1 between direct and overlay views). In this case, automatic target detection and recognition algorithms can be applied to the full and peripheral field-of-view (outside the current view field of the user through the direct view optics). If a target is detected in the periphery, for instance through ATR and change detection approaches, the optical overlay device can cue the user to the change. The cues may be graphical indicators such as arrows, bars, or lines to guide the viewer as to where the change was detected. This provides the capability for a sniper to maintain wider-area situational awareness when zoomed in to scrutinize a target, thus eliminating drawbacks of using high magnification scopes with a soda-straw view.

Figure 11:
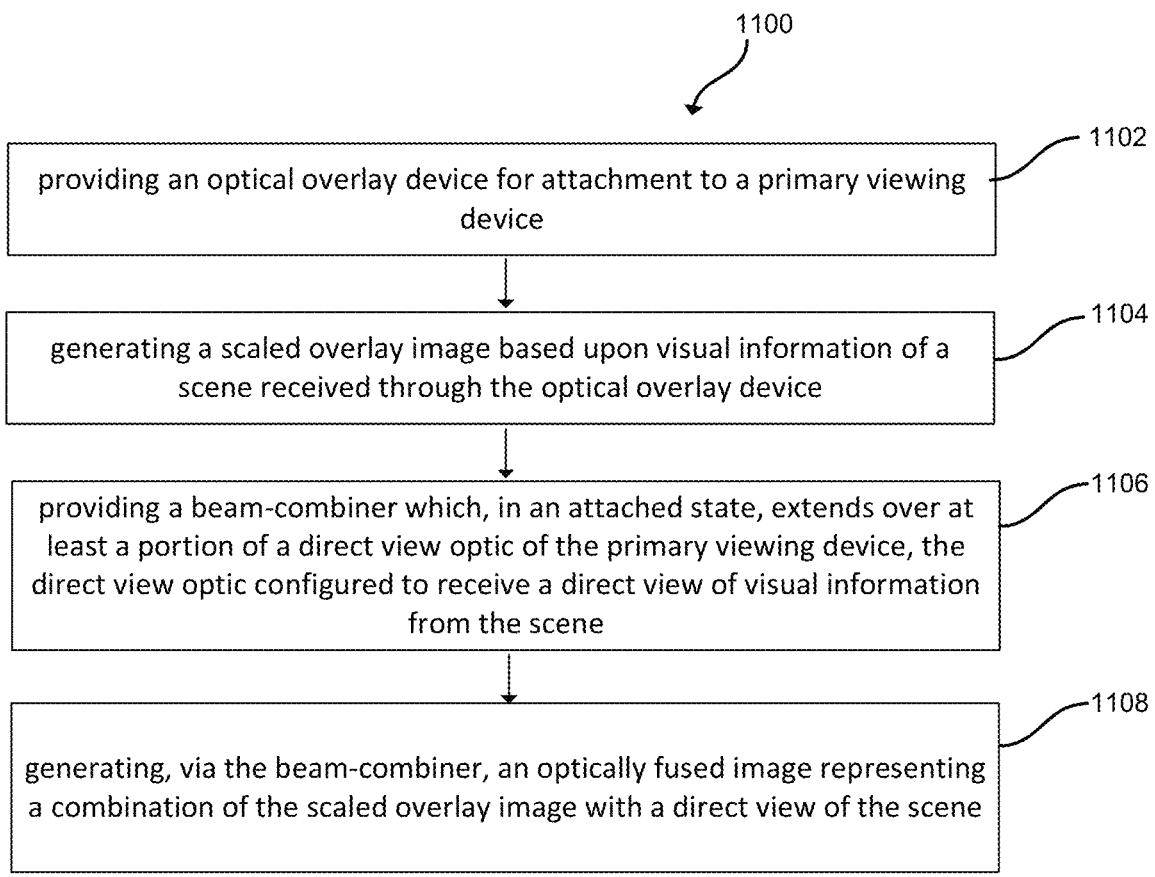
FIG. 11 illustrates an example method in accordance with one or more embodiments of the present disclosure.

FIG. 11 illustrates an example method 1100 in accordance with one or more embodiments of the present disclosure. At operation 1102, method 1100 involves providing an optical overlay device for attachment to a primary viewing device. At operation 1104, method 1100 involves generating a scaled overlay image based upon visual information of a scene received through the optical overlay device. At operation 1106, method 1100 involves providing a beam-combiner which, in an attached state, extends over at least a portion of a direct view optic of the primary viewing device, the direct view optic configured to receive a direct view of visual information from the scene. At operation 1106, method 1100 involves generating, via the beam-combiner, an optically fused image representing a combination of the scaled overlay image with a direct view of the scene.

Figure 12:
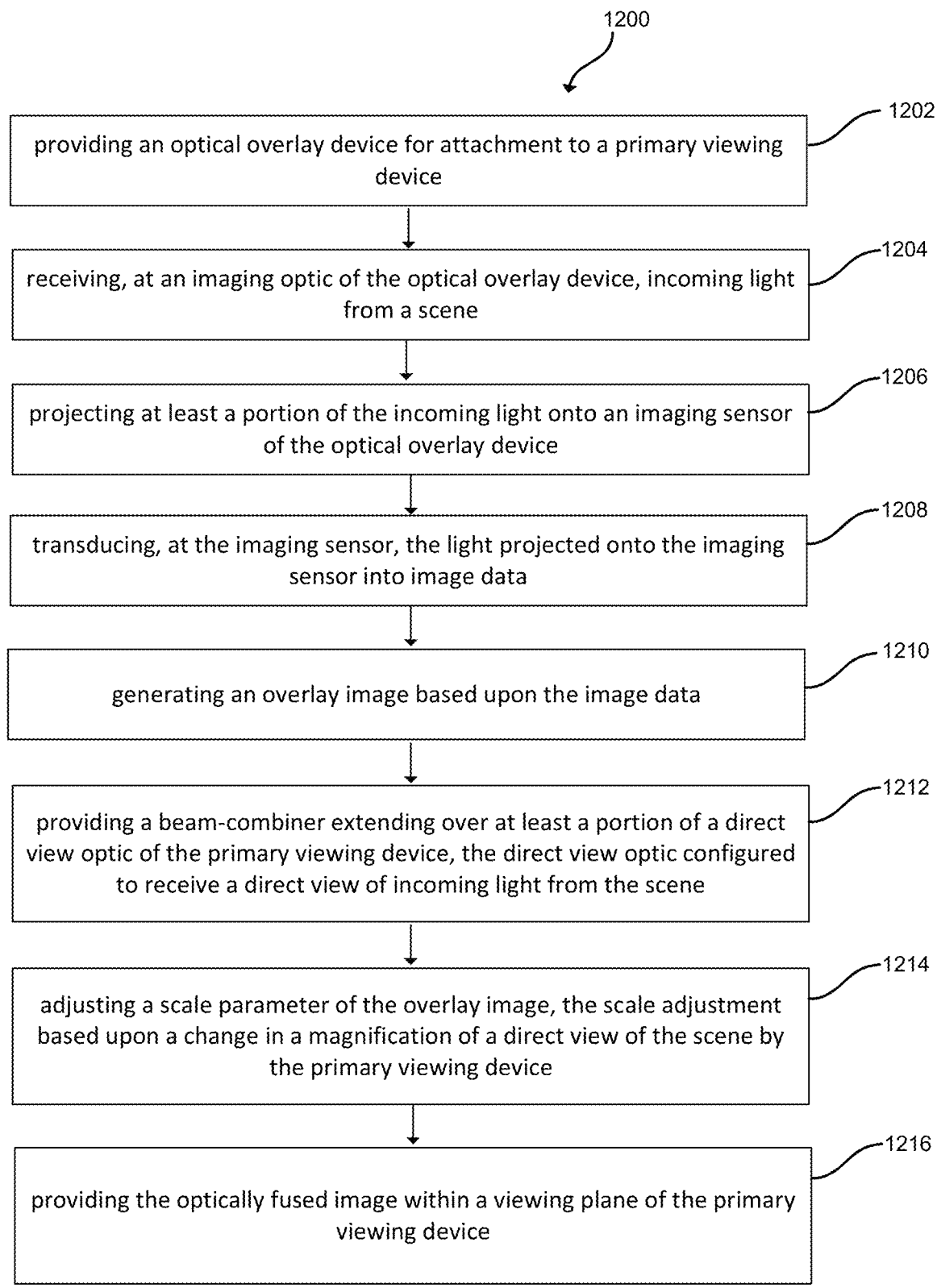
FIG. 12 illustrates an example method in accordance with one or more embodiments of the present disclosure.

FIG. 12 illustrates an example method 1200 in accordance with one or more embodiments of the present disclosure. At operation 1202, method 1200 involves providing an optical overlay device for attachment to a primary viewing device. At operation 1204, method 1200 involves receiving, at an imaging optic of the optical overlay device, incoming light from a scene. At operation 1206, method 1200 involves projecting at least a portion of the incoming light onto an imaging sensor of the optical overlay device. At operation 1208, method 1200 involves transducing, at the imaging sensor, the light projected onto the imaging sensor into image data. At operation 1210, method 1200 involves generating an overlay image based upon the image data. At operation 1212, method 1200 involves providing a beam-combiner extending over at least a portion of a direct view optic of the primary viewing device, the direct view optic configured to receive a direct view of incoming light from the scene. At operation 1214, method 1200 involves adjusting a scale parameter of the overlay image, the scale adjustment based upon a change in a magnification of a direct view of the scene by the primary viewing device. At operation 1216, method 1200 involves providing the optically fused image within a viewing plane of the primary viewing device.

Figure 13:
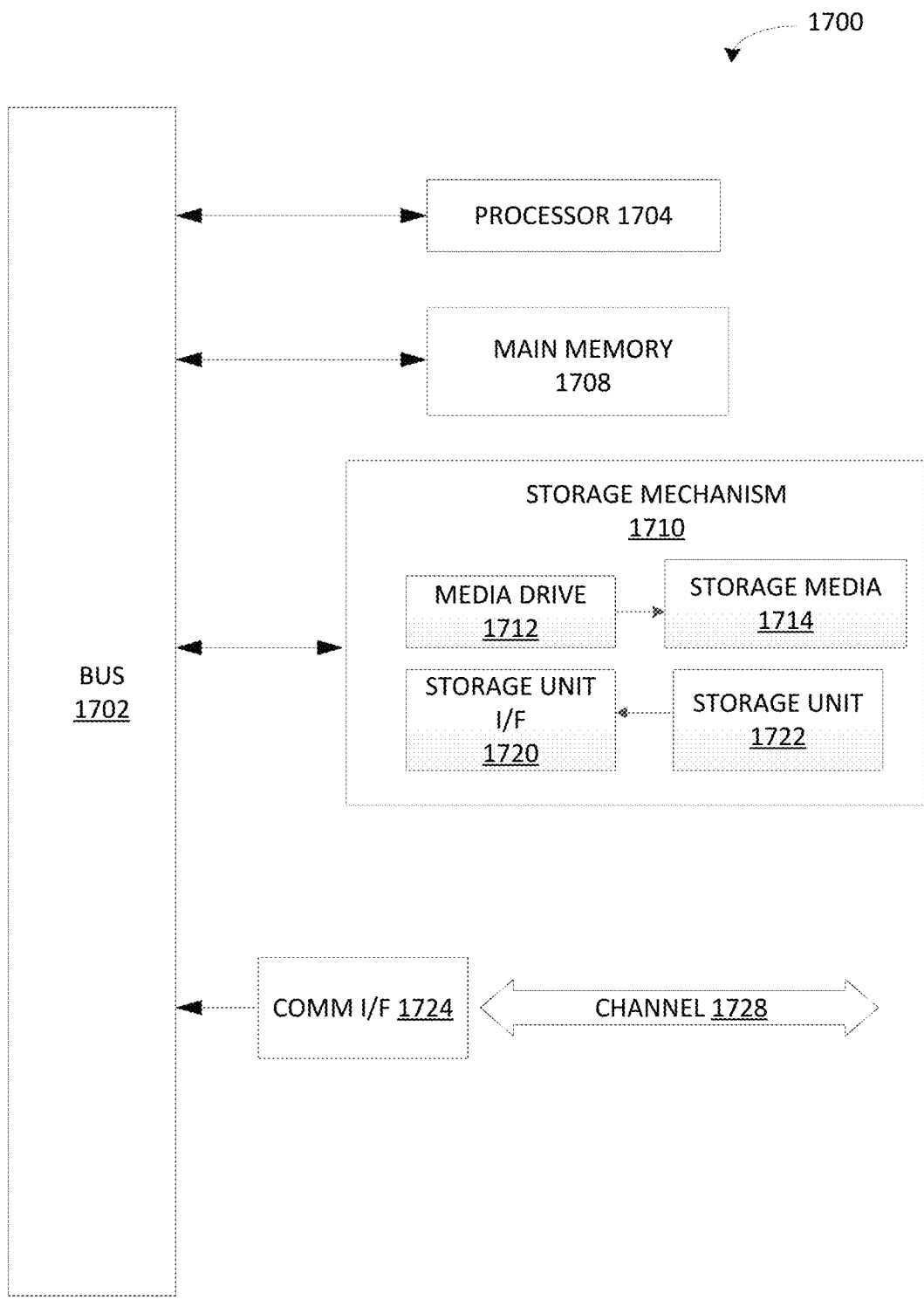
FIG. 13 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 13. Various embodiments are described in terms of this example-computing module 1700. After reading this description, it will become apparent to a person skilled in the relevant art how to implement the technology using other computing modules or architectures.

Referring now to FIG. 13, computing module 1700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1700 might include, for example, one or more processors, controllers, control modules, or other processing devices, such as a processor 1704. Processor 1704 might be implemented using a general-purpose or special-purpose processing engine such as, for example, a microprocessor, controller, or other control logic. In the illustrated example, processor 1704 is connected to a bus 1702, although any communication medium can be used to facilitate interaction with other components of computing module 1700 or to communicate externally.

Computing module 1700 might also include one or more memory modules, simply referred to herein as main memory 1708. For example, preferably random access memory (RAM) or other dynamic memory, might be used for storing information and instructions to be executed by processor 1704. Main memory 1708 might also be used for storing temporary variables or other intermediate information during execution of instructions to be executed by processor 1704. Computing module 1700 might likewise include a read only memory ("ROM") or other static storage device coupled to bus 1702 for storing static information and instructions for processor 1704.

The computing module 1700 might also include one or more various forms of information storage mechanism 1710, which might include, for example, a media drive 1712 and a storage unit interface 1720. The media drive 1712 might include a drive or other mechanism to support fixed or removable storage media 1714. For example, a hard disk drive, a floppy disk drive, a magnetic tape drive, an optical disk drive, a CD or DVD drive (R or RW), or other removable or fixed media drive might be provided. Accordingly, storage media 1714 might include, for example, a hard disk, a floppy disk, magnetic tape, cartridge, optical disk, a CD or DVD, or other fixed or removable medium that is read by, written to or accessed by media drive 1712. As these examples illustrate, the storage media 1714 can include a computer usable storage medium having stored therein computer software or data.

In alternative embodiments, information storage mechanism 1710 might include other similar instrumentalities for allowing computer programs or other instructions or data to be loaded into computing module 1700. Such instrumentalities might include, for example, a fixed or removable storage unit 1722 and an interface 1720. Examples of such storage units 1722 and interfaces 1720 can include a program cartridge and cartridge interface, a removable memory (for example, a flash memory or other removable memory module) and memory slot, a PCMCIA slot and card, and other fixed or removable storage units 1722 and interfaces 1720 that allow software and data to be transferred from the storage unit 1722 to computing module 1700.

Computing module 1700 might also include a communications interface 1724. Communications interface 1724 might be used to allow software and data to be transferred between computing module 1700 and external devices. Examples of communications interface 1724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1724 might typically be carried on signals, which can be electronic, electromagnetic (which includes optical) or other signals capable of being exchanged by a given communications interface 1724. These signals might be provided to communications interface 1724 via a channel 1728. This channel 1728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1708, storage unit 1720, media 1714, and channel 1728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
an optical overlay device comprising:
an imaging optic to receive incoming light from a scene, and project at least a portion of the incoming light onto an imaging sensor;
an imaging sensor to transduce into image data the light projected onto it by the imaging optic, wherein the imaging sensor detects light in an electromagnetic spectrum invisible to the human eye such that the image data includes an image visible to the human eye representing the scene in the electromagnetic spectrum invisible to the human eye;
a processing engine electrically coupled with a non-transitory computer readable medium having machine readable instructions stored thereon, which, when executed by the processing engine, cause the system to:
automatically generate a scaled overlay image based on the image data and a magnification parameter, wherein the magnification parameter is an adjustable magnification state of a primary viewing device and wherein generating the scaled overlay image comprises one or more of automatically incrementing and decrementing, based on a detected magnification state of the primary viewing device, the number of pixels displayed horizontally and the number of pixels displayed vertically such that the scaled overlay is displayable directly into a view of adjustable magnification optics of the primary viewing device;
a display device configured to project the scaled overlay image through a display optic toward a portion of a beam-combiner;
a coupling mechanism to enable releasable attachment of the optical overlay device with the primary viewing device, wherein in an attached position at least a portion of the beam-combiner extends over at least a portion of a direct view optic of the primary viewing device, the direct view optic configured to receive a direct view of incoming light from the scene; and
wherein the beam-combiner is configured to generate an optically fused image viewable by a user through the primary viewing device, the optically fused image representing a combination of the scaled overlay image and the direct view of the scene such that the optically fused image includes the incoming light from the scene that is visible to the human eye via the direct view optic fused with the image representing the scene in the electromagnetic spectrum that is invisible to the eye via the imaging sensor.

2. The system of claim 1, wherein generating the scaled overlay image occurs responsive to a user actuation of a button coupled to the optical overlay device.

3. The system of claim 1, further comprising a sensor coupled with the primary viewing device and the overlay device, wherein generating the scaled overlay image occurs continuously, and continuously adjusts responsive to the sensor detecting a change in a magnification state of the primary viewing device.

4. The system of claim 3, wherein the sensor is configured to detect one or more of: a rotation angle of a magnification element of the primary viewing device, and a displacement position of a magnification element of the primary viewing device.

5. The system of claim 1, wherein the non-transitory computer readable medium further comprises machine readable instructions stored thereon, which, when executed by the processor, cause the system to: adjust a position of the overlay image presented through the primary viewing device, the position adjustment occurring responsive to a change in the magnification state of the primary viewing device.

6. The system of claim 1, further comprising a periscope assembly optically coupled to the optical display device, the periscope configured to transmit the incoming light from the scene to the imaging optic of the optical overlay device.

7. The system of claim 6, wherein the periscope assembly is rotatably coupled to the optical overlay device such that the position of the periscope assembly about a primary axis of the optical overlay device is adjustable.

8. The system of claim 1, wherein the non-transitory computer readable medium further comprises machine readable instructions stored thereon, which, when executed by the processor, cause the system to: switch between a first viewing mode and a second viewing mode in response to a user selection, wherein in the first viewing mode the overlay image is presented as a semi-transparent image overlapping the direct view of the scene, and in the second viewing mode the overlay image is presented as an opaque image completely blocking the direct view of the scene.

9. The system of claim 1, wherein the non-transitory computer readable medium further comprises machine readable instructions stored thereon, which, when executed by the processor, cause the system to: switch between a first viewing mode and a second viewing mode in response to a user selection, wherein in the first viewing mode the overlay image is presented as an outline at least partially circumscribing an object within the direct view of the scene, and in the second viewing mode the overlay image is presented as a grayscale image covering at least a portion of the object within the direct view of the scene.

10. The system of claim 1, wherein the non-transitory computer readable medium further comprises machine readable instructions stored thereon, which, when executed by the processor, cause the system to: adjust a characteristic of the overlay image in response to a user selection, wherein the characteristic adjusted includes one or more of: brightness, contrast, image sharpness, and color.

11. The system of claim 1, wherein the electromagnetic spectrum invisible to the human eye comprises one or more of: near-infrared, short-wave infrared, mid-wave infrared, long-wave infrared, and ultraviolet.

12. The system of claim 1, wherein the imagine sensor further detects faint or modulated signals.

13. The system of claim 12, wherein the image sensor comprises an image intensifier (I2), or a digital night vision sensor.

14. The system of claim 1, wherein the imagine sensor further performs advanced image processing for computer-aided recognition, identification, and tracking.

15. A method, comprising:
providing an optical overlay device for attachment to a primary viewing device;
receiving, at an imaging optic of the optical overlay device, incoming light from a scene;
projecting at least a portion of the incoming light onto an imaging sensor of the optical overlay device, wherein the imaging sensor detects light from the scene in an electromagnetic spectrum invisible to the human eye;
transducing, at the imaging sensor, the light projected onto the imaging sensor into image data;
generating an overlay image based upon the image data, wherein the overlay image includes an image visible to the human eye representing the scene in the electromagnetic spectrum invisible to the human eye;
providing a beam-combiner extending over at least a portion of a direct view optic of the primary viewing device, the direct view optic configured to receive a direct view of incoming light from the scene;
automatically adjusting a scale parameter of the overlay image, the scale adjustment based upon a change in a magnification of a direct view of the scene by the primary viewing device, wherein generating the scaled overlay image comprises one or more of automatically incrementing and decrementing, based on the change in magnification of the direct view of the scene by the primary viewing device, the number of pixels displayed horizontally and the number of pixels displayed vertically such that the scaled overlay image is displayable directly into the direct view of the scene of the primary viewing device;
generating, via the beam-combiner, an optically fused image representing a combination of the scaled overlay image with a direct view of the scene such that the optically fused image includes the incoming light from the scene that is visible to the human eye from the primary viewing device fused with the scaled overlay image representing the scene in the electromagnetic spectrum that is invisible to the eye via the imaging sensor of the optical overlay device;
providing the optically fused image within a viewing plane of the primary viewing device.

16. The method of claim 15, wherein adjusting the scale of the overlay image occurs responsive to a user actuation of a button coupled to the optical overlay device.

17. The method of claim 15, further comprising: providing a magnification sensor, the magnification sensor coupled with the primary viewing device and the overlay device, wherein adjusting the scale of the overlay image occurs responsive to the magnification sensor detecting a change in a magnification state of the primary viewing device.

18. The method of claim 17, wherein the magnification sensor is configured to detect one or more of: a rotation angle of a magnification element of the primary viewing device, and a displacement position of a magnification element of the primary viewing device.

19. The method of claim 15, further comprising: adjusting a position of the overlay image presented through the primary viewing device, the position adjustment occurring responsive to the scale adjustment.

20. The method of claim 15, further providing a periscope assembly optically coupled with the display device such that the periscope projects the incoming light from the scene to the imaging optic of the optical overlay device.

21. The method of claim 20, wherein the periscope assembly is rotatably coupled to the optical overlay device such that the position of the periscope assembly about a primary axis of the optical overlay device is adjustable.

22. The method of claim 15, further comprising: switching between a first viewing mode and a second viewing mode in response to a user selection, wherein in the first viewing mode the overlay image is presented as a semi-transparent image overlapping the direct view of the scene, and in the second viewing mode the overlay image is presented as an opaque image completely blocking the direct view of the scene.

23. The method of claim 15, further comprising: switching between a first viewing mode and a second viewing mode in response to a user selection, wherein in the first viewing mode the overlay image is presented as an outline at least partially circumscribing an object within the direct view of the scene, and in the second viewing mode the overlay image is presented as a grayscale image covering at least a portion of the object within the direct view of the scene.

24. The method of claim 15, further comprising adjusting a characteristic of the overlay image in response to a user selection, wherein the characteristic adjusted includes one or more of: brightness, image sharpness, contrast, and color.

25. The method of claim 15, further comprising automatically detecting a target using one or more of overlay image information, gee-spatial information, imaging information, and visual information originating from an external source and transmitted to the optical overlay device.

26. The method of claim 15, further comprising automatically adjusting the overlay image based on one or more of gee-spatial information, imaging information, and visual information originating from an external source and transmitted to the optical overlay device.

27. A method, comprising:
providing an optical overlay device for attachment to a primary viewing device, wherein the optical overlay device detects light from a scene in an electromagnetic spectrum invisible to the human eye;
automatically generating a scaled overlay image based upon an image visible to the human eye representing the light from the scene in the electromagnetic spectrum invisible to the human eye from the optical overlay device and based upon a change in a magnification of a direct view of the scene by the primary viewing device, wherein generating the scaled overlay image comprises one or more of automatically incrementing and decrementing, based on the change in magnification of the direct view of the scene by the primary viewing device, the number of pixels displayed horizontally and the number of pixels displayed vertically such that the scaled overlay image is displayable directly into the direct view of the scene of the primary viewing device;
providing a beam-combiner extending over at least a portion of a direct view optic of the primary viewing device, the direct view optic configured to receive a direct view of incoming light from the scene;
generating, via the beam-combiner, an optically fused image representing a combination of the scaled overlay image with a direct view of the scene such that the optically fused image includes the incoming light from the scene that is visible to the human eye from the primary viewing device fused with the scaled overlay image representing the light from the scene in the electromagnetic spectrum that is invisible to the eye via the optical overlay device.

* * * * *